(12) United States Patent
Lim (10) Patent No.: US 11,520,553 B2
(45) Date of Patent: Dec. 6, 2022

(54) GAP ADJUSTING DEVICE OF MULTI-DISPLAY AND MULTI-DISPLAY INCLUDING THE SAME

(71) Applicant: LG Display Co., Ltd., Seoul (KR)

(72) Inventor: Gilyoung Lim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 426 days.

(21) Appl. No.: 16/723,704

(22) Filed: Dec. 20, 2019

(65) Prior Publication Data

US 2020/0201590 A1 Jun. 25, 2020

(30) Foreign Application Priority Data

Dec. 20, 2018 (KR) .................. 10-2018-0166677

(51) Int. Cl.
  *G06F 3/14* (2006.01)
  *G02F 1/1333* (2006.01)
  *G06F 1/16* (2006.01)

(52) U.S. Cl.
  CPC ........ *G06F 3/1446* (2013.01); *G02F 1/13336* (2013.01); *G06F 1/1601* (2013.01); *G02F 2201/46* (2013.01)

(58) Field of Classification Search
  CPC .. G06F 3/1446; G06F 1/1601; G02F 1/13336; G02F 2201/46
  USPC .......................................................... 349/73
  See application file for complete search history.

(56) References Cited

U.S. PATENT DOCUMENTS

2017/0268554 A1* 9/2017 Li .......................... F16B 21/09
2020/0166966 A1* 5/2020 Lee ....................... G06F 1/1637

FOREIGN PATENT DOCUMENTS

| CN | 203644332 U | 6/2014 |
| CN | 206925900 U | 1/2018 |
| JP | 7-317726 A | 12/1995 |
| KR | 10-2016-0121681 A | 10/2016 |

* cited by examiner

*Primary Examiner* — Charles S Chang
(74) *Attorney, Agent, or Firm* — Birch, Stewart, Kolasch & Birch, LLP

(57) ABSTRACT

A gap adjusting device for adjusting the gap of displays adjacent to each other of a multi-display, is discussed. The gap adjusting device can include a locking part fastened to a first display, and having an uneven part formed thereon, a fastening part having one side end rotatably fastened to a second display adjacent to the first display, and having a fastening protrusion formed at the other side end thereof to be inserted into and fastened to the uneven part of the locking part, and an elastic member provided at the fastening part, and for applying an elastic force in order to keep a state where the fastening protrusion has been inserted into the uneven part of the locking part. According to such a configuration, it is possible to achieve the zero gap so that the gap does not occur between the displays, thereby enhancing the display quality of the multi-display.

10 Claims, 6 Drawing Sheets

GAP ADJUSTING DEVICE OF MULTI-DISPLAY AND MULTI-DISPLAY INCLUDING THE SAME

CROSS-REFERENCE TO RELATED APPLICATIONS

This application claims priority to Korean Patent Application No. 10-2018-0166677, filed on Dec. 20, 2018 in the Republic of Korea, the disclosure of which is incorporated herein by reference in its entirety into the present application.

BACKGROUND OF THE DISCLOSURE

Field of the Disclosure

The present disclosure relates to a gap adjusting device of a multi-display and the multi-display including the same, and more particularly, to a gap adjusting device and the multi-display including the same, which are coupled to the displays adjacent to each other of the multi-display and for easily adjusting the gap between the displays.

Description of the Related Art

When a display device is installed in a place where many people are crowded or in a public facility used by many people, a large-sized display device is required due to the characteristics of the installed place. Although a multi-display device is composed of a plurality of displays, the multi-display device is driven as if an image is driven on one screen, such that the multi-display device can effectively provide image information to many people in a public place.

Meanwhile, in general, the multi-display device can be implemented by arranging a plurality of display modules in a tile form. However, there is a problem in that when the plurality of display modules are installed in the rear space of the multi-display device, the work space of the worker should be secured in the rear space of the multi-display device, such that a large space is required to install the multi-display device in the public place or the public facility.

SUMMARY OF THE DISCLOSURE

The present disclosure is intended to solve or address the above and other problems and limitations of the related art, and an object of the present disclosure is to provide a gap adjusting device of a multi-display and the multi-display including the same, which can easily adjust a gap between a plurality of displays adjacent to each other of the multi-display.

For achieving these objects, a gap adjusting device of a multi-display according to a preferred embodiment of the present disclosure is to adjust a gap between the displays adjacent to each other of a multi-display, and includes a locking part fastened to a first display, and having an uneven part formed thereon; a fastening part having one side end rotatably fastened to a second display adjacent to the first display, and having a fastening protrusion formed at the other side end thereof to be inserted into and fastened to the uneven part of the locking part; and an elastic member provided at the fastening part, and for applying an elastic force in order to keep a state where the fastening protrusion has been inserted into the uneven part of the locking part.

More specifically, the locking part can include a flange prepared in a pair to be disposed to face each other, and spaced apart from each other so that the fastening part is inserted; a connecting part for connecting the pair of flanges, and prepared with a diameter smaller than the flange; and the uneven part formed along the outer circumferential surface of the connecting part.

Then, the locking part can have any one side of flange adhered and fastened to the first display, or have a fastening hole, which is formed to be penetrated at the center of the connecting part, inserted into and fastened to a first protrusion prepared in the first display.

The elastic member can be formed to be bent so that a plate spring of a ring shape having a certain width has a wavy shape along the circumferential direction thereof, and prepared so that an inside contact part and an outside contact part having diameters differently from each other are formed along the circumferential direction thereof.

Then, the fastening part can be prepared to have a through-hole formed at one side end thereof, and to have an insertion groove formed at a diameter corresponding to the diameter of the outside contact part of the elastic member along the circumferential direction from the inside surface of the through-hole so that the elastic member is inserted therein and fastened thereto.

In this case, the elastic member can have the inside contact part inserted into and fastened to a second protrusion prepared in the second display, and have the outside contact part inserted into and fastened to the insertion groove of the fastening part, and the through-hole of the fastening part can be prepared to have a diameter larger than the second protrusion.

Alternatively, the fastening part can also be prepared to include a rotary member having a rotary hole formed at one side end thereof so that the outside contact part of the elastic member is fitted therein and fastened thereto, and having the fastening protrusion formed at the other side end thereof; a fixing member adhered and fastened to the second display, and having a support protrusion formed so that the inside contact part of the elastic member is fitted therein and fastened thereto; and a cap member fastened to the fixing member in order to prevent the rotary member from being detached from the fixing member.

Alternatively, the fastening part can also be prepared to include a rotary link rotatably fastened to the second display; and a fastening link fastened to the rotary link to be slidably moved, and having the fastening protrusion formed at the end portion thereof, and the elastic member is fastened between the rotary link and the fastening link.

Furthermore, the fastening part can also be prepared to have the other side end prepared to have a ring shape, and have the fastening protrusion formed at the end thereof toward the inside of the longitudinal direction thereof, and when the fastening protrusion is formed in two or more, they are formed at an interval corresponding to the uneven part of the locking part.

Then, for achieving the object, a multi-display according to a preferred embodiment of the present disclosure includes a first display; a second display disposed adjacent to the first display; and a gap adjusting device coupled with the first display and the second display, respectively, and for adjusting the gap between the first display and the second display, and the gap adjusting device includes a locking part provided in the first display, and having an uneven part formed thereon; a fastening part having one side end rotatably fastened to the second display, and having a fastening protrusion formed at the other side end thereof to be inserted into and fastened to the uneven part of the locking part; and an elastic member provided at the fastening part, and for applying an elastic force in order to keep a state where the fastening protrusion has been inserted into the uneven part of the locking part.

DESCRIPTION OF THE EMBODIMENTS

In order to facilitate understanding of the features of the present disclosure, a gap adjusting device of a multi-display and the multi-display including the same according to an embodiment of the present disclosure will be described in more detail below.

It should be noted that, in order to facilitate understanding of the embodiments described below, in denoting the reference numerals to the components in each accompanying drawing, the same components are denoted by the same reference numerals as possible even though they are illustrated in different drawings. In addition, in the description of the present disclosure, a specific description of related known configurations or functions will be omitted when it is determined to obscure the subject matter of the present disclosure.

Hereinafter, various embodiments of the present disclosure will be described with reference to the accompanying drawings.

Figure 1:
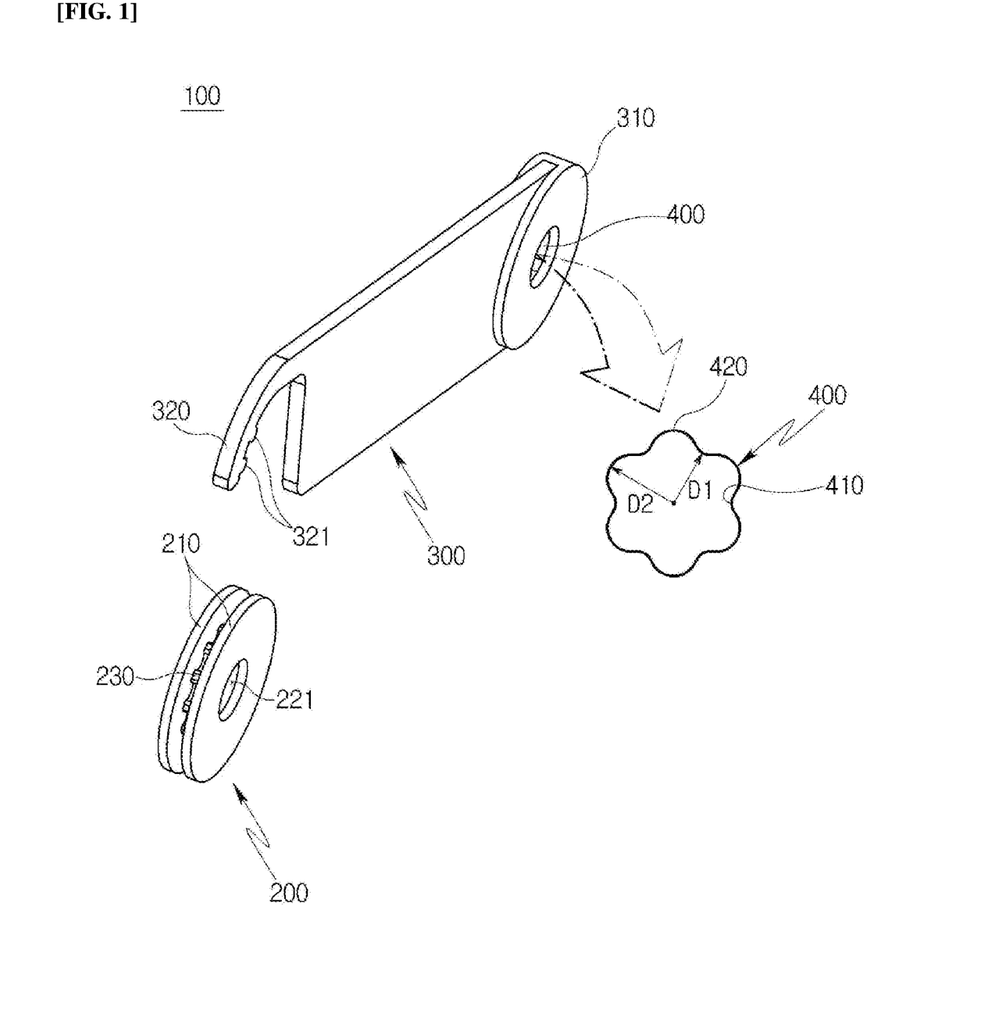
FIG. 1 is a perspective diagram schematically illustrating a gap adjusting device of a multi-display according to an embodiment of the present disclosure.
Figure 2A:
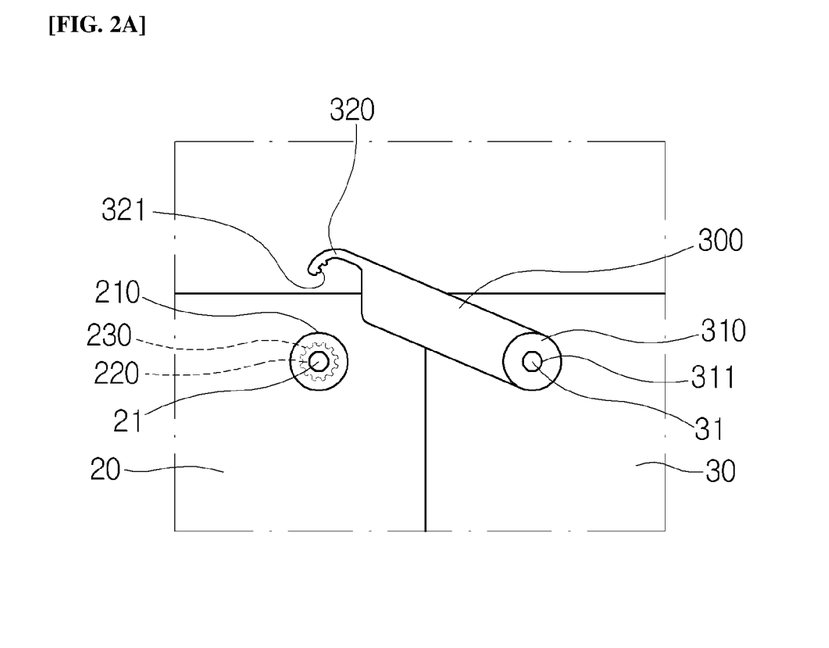
FIGS. 2A and 2B are front diagrams schematically illustrating a state where the gap adjusting device of the multi-display according to an embodiment of the present disclosure is installed and fastened to displays.
Figure 2B:
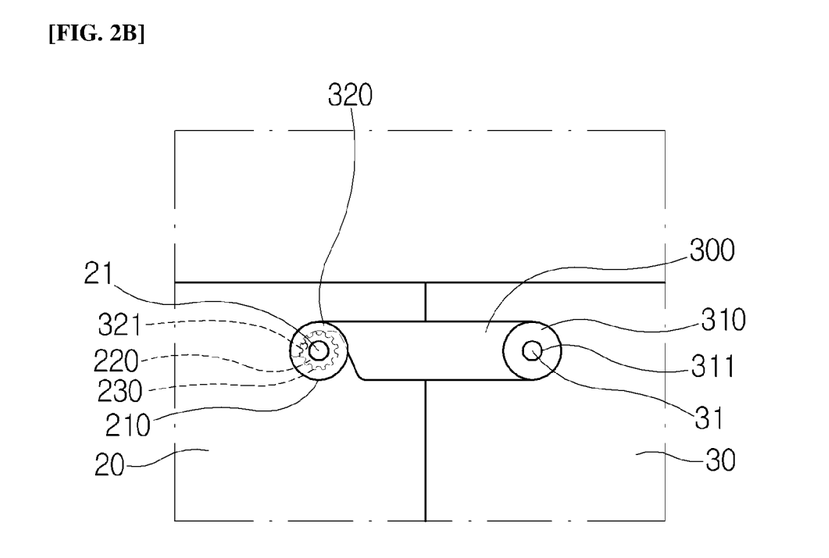
Figure 3:
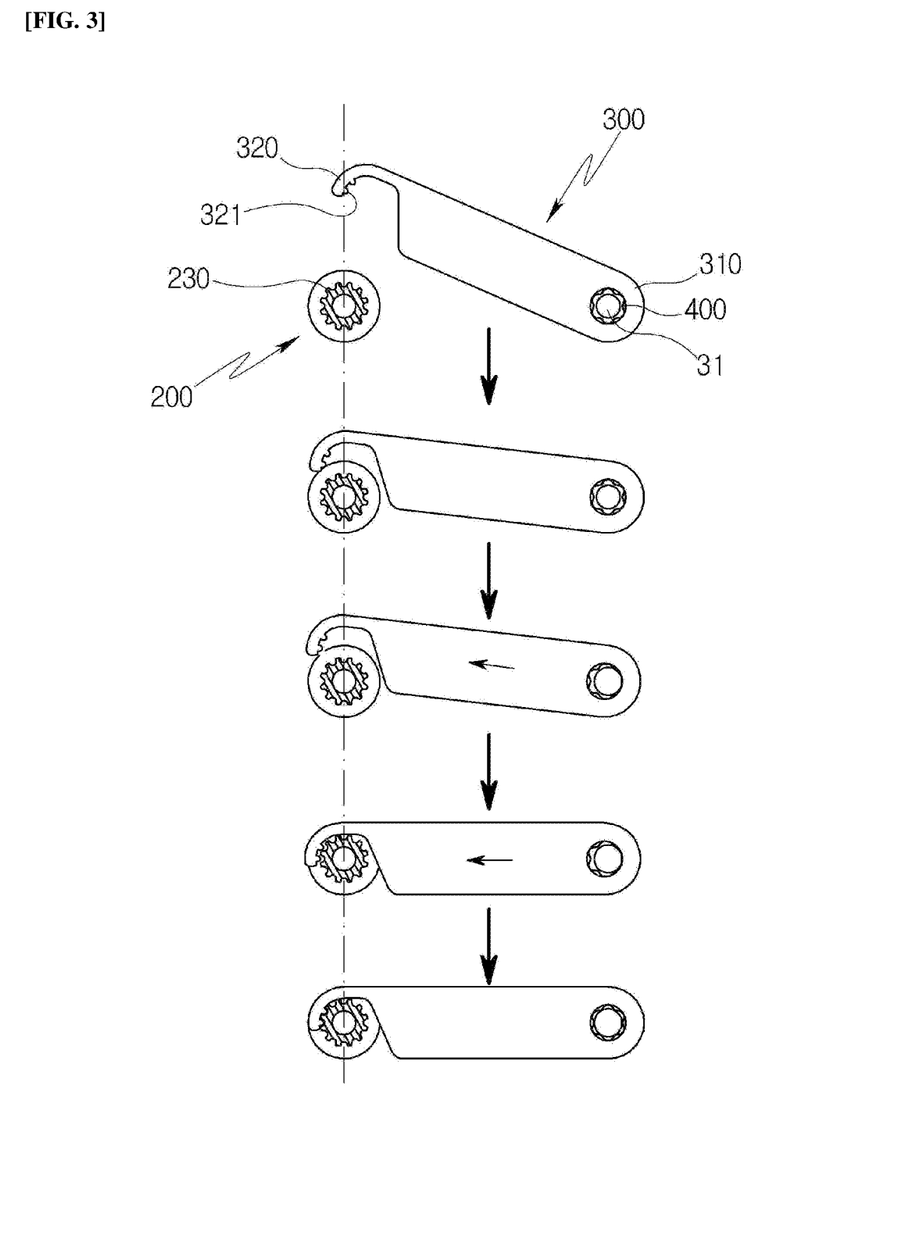
FIG. 3 is a front diagram schematically illustrating an operating state where a fastening part is fastened to a locking part in the gap adjusting device of the multi-display according to an embodiment of the present disclosure.
Figure 4:
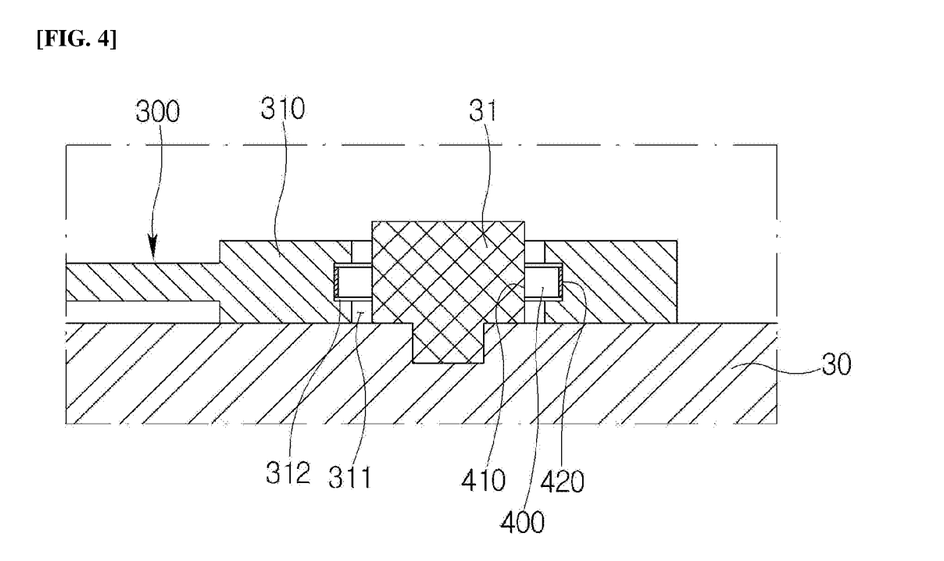
FIG. 4 is a diagram schematically illustrating one side end of the fastening part in the gap adjusting device of the multi-display according to an embodiment of the present disclosure.

FIG. 1 is a perspective diagram schematically illustrating a gap adjusting device of a multi-display according to an embodiment of the present disclosure, and FIGS. 2A and 2B are front diagrams schematically illustrating a state where the gap adjusting device is installed and fastened to displays. FIG. 3 is a front diagram schematically illustrating an operating state where a fastening part is fastened to a locking part in the gap adjusting device, and FIG. 4 is a diagram schematically illustrating one side end of the fastening part. All the components of the gap adjusting device according to all embodiments of the present disclosure are operatively coupled and configured.

Referring to FIGS. 1 to 4, a gap adjusting device 100 of a multi-display according to an embodiment of the present disclosure is prepared to adjust a gap between displays adjacent to each other. For example, when a plurality of displays are installed in a tile form, the displays adjacent to each other are prepared to be in close contact with each other so that the gap does not occur between the displays adjacent to each other. However, the gap adjusting device of the present disclosure can be applied to various types of displays arranged in various forms or configurations.

The gap adjusting device 100 includes a locking part 200 fastened to a first display 20 and having an uneven part 230 formed thereon, a fastening part 300 having one side end 310 rotatably fastened to a second display 30 adjacent to the first display 20 and having a fastening protrusion 321 formed at the other side end (or another side end) 320 thereof to be inserted into and fastened to the uneven part 230 of the locking part 200, and an elastic member 400 provided at the fastening part 300 and for applying an elastic force in order to keep a state where the fastening protrusion 321 has been inserted into the uneven part 230 of the locking part 200.

For example, as illustrated in FIG. 2A, the locking part 200 is fastened to the first display 20 and the fastening part 300 is fastened to the second display 30, and then, as illustrated in FIG. 2B, the fastening part 300 is fastened to the locking part 200 so that the first display 20 and the second display 30 can be fastened in close contact with each other.

When the fastening part 300 is rotated toward the locking part 200 side and then the fastening part 300 is pulled, the fastening part 300 is moved at a certain distance while an elastic force is generated in the elastic member 400. Herein, when the fastening part 300 is rotated without being pulled, the fastening protrusion 321 contacts the uneven part 230, and thereby it is no longer possible to rotate while the movement thereof is restricted, and it becomes a state where the fastening protrusion 321 is not inserted into the uneven part 230. Therefore, it is necessary to pull and move the fastening part 300 so that the fastening protrusion 321 does not contact the uneven part 230.

As described above, when the fastening part 300 is pulled and then rotated, the fastening protrusion 321 of the fastening part 300 is not locked by the uneven part 230 of the locking part 200, such that when the fastening part 300 is further rotated to move to a position where the fastening protrusion 321 can be inserted into the uneven part 230 and then the fastening part 300 is released, the fastening protrusion 321 is inserted into the uneven part 230 by the elastic force of the elastic member 400.

Therefore, the first display 20 and the second display 30 can be disposed to be in close contact with each other at a zero gap by the elastic force of the elastic member 400 while the fastening part 300 is fastened to the locking part 200.

More specifically, the locking part 200 include a flange 210 prepared in a pair to be disposed to face each other and spaced apart from each other so that the fastening part 300 is inserted therein, a connecting part 220 for connecting the pair of flanges 210 and having a diameter smaller than the flange 210, and the uneven part 230 formed along the outer circumferential surface of the connecting part 220.

For example, the locking part 200 is prepared to have the cross section formed in a bobbin shape of an H shape, and prepared to have the pair of the flanges 210 having a large diameter disposed at both sides thereof, and so that the connecting part 220 having a small diameter connects the pair of flanges 210 at the center of the flange 210.

Herein, the uneven part 230 is prepared to have a teeth shape of a gear and formed along the circumferential direction of the connecting part 220.

Therefore, the fastening part 300 can be inserted between the pair of flanges 210 and locked and fastened to the uneven part 230 prepared to have the teeth shape of the gear, thereby preventing the locking part 200 from being easily detached from the fastening part 300.

The locking part 200 can be fastened by contacting the flange 210 to the first display 20 by using an adhesive agent, etc. Alternatively, a fastening hole 221 having the center penetrated therein is formed in the connecting part 220, and a first protrusion 21 is prepared in the first display 20, such that the fastening hole 221 of the connecting part 220 can also be inserted into and fastened to the first protrusion 21. Of course, the method for fastening the locking part 200 to the first display 20 is not limited thereto, and various known fastening methods can be applied thereto.

The elastic member 400 can be formed to be bent so that a plate spring of a ring shape having a certain width has a wavy shape along the circumferential direction thereof and prepared so that an inside contact part 410 and an outside contact part 420 having diameters differently from each other are formed along the circumferential direction thereof.

For example, as illustrated in FIG. 1, the elastic member 400 is prepared to have a sunflower shape (however, other shape can be used), and prepared as a structure in which the inside contact part 410 can be prepared with a radius of D1 to be fixed in position to a fixing means, and the outside contact part 420 can be prepared with a radius of D2 larger than the radius D1 of the inside contact part 410 to be fixed to a moving means, thereby radially generating the elastic force around the center axis thereof. According to such a configuration, even if the fastening part 300 is pulled at any angle while rotating, it is possible to apply the elastic force to the fastening part 300.

For example, as illustrated in FIG. 4, the elastic member 400 can be prepared so that the outside contact part 420 is supported in contact therewith by being inserted into an insertion groove 312 formed at a diameter corresponding to the diameter of the outside contact part 420 along the circumferential direction from the inside surface of a through-hole 311 formed at one side end 310 of the fastening part 300, and the inside contact part 410 is inserted into and fastened to a second protrusion 31 prepared in the second display 30. At this time, the through-hole 311 of the fastening part 300 is formed to have a diameter larger than the second protrusion 31. As a result, the elastic member 400 can be inserted into the insertion groove 312 formed at one side end 310 of the fastening part 300 to be stably supported, and inserted into and fastened to the second protrusion 31 to stably apply the elastic force to the fastening part 300.

Herein, the fastening part 300 has the other side end 320 prepared in a ring shape and has the fastening protrusion 321 formed in the longitudinal direction inwardly from the end thereof. Then, the fastening protrusion 321 can be formed in two or more in order to increase the fastening force, and when the fastening protrusion 321 is prepared in two or more, the fastening protrusions 321 are formed at an interval corresponding to the uneven part of the locking part 200.

Describing an operating state where the fastening part 300 is fastened to the locking part 200 when it is prepared with such a configuration, referring to FIG. 3, when the user rotates the fastening part 300 to the locking part 200 side and then pulls the fastening part 300, the elastic member 400 is compressed in the direction opposite to the direction of being pulled around the second protrusion 31 to generate the elastic force, and when the fastening part 300 is rotated in the horizontal direction so that the fastening protrusion 321 is disposed at the front of the uneven part 230 in a state where the fastening part 300 has been pulled and then released, the fastening protrusion 321 is inserted into and fastened to the uneven part 230 while the fastening part 300 returns to its original position by the elastic force of the elastic member 400. Through this simple structure and method, the adjacent displays can be fastened in the zero gap state.

Of course, the shape of the fastening part is not limited thereto, but can be prepared in other forms.

Figure 5:
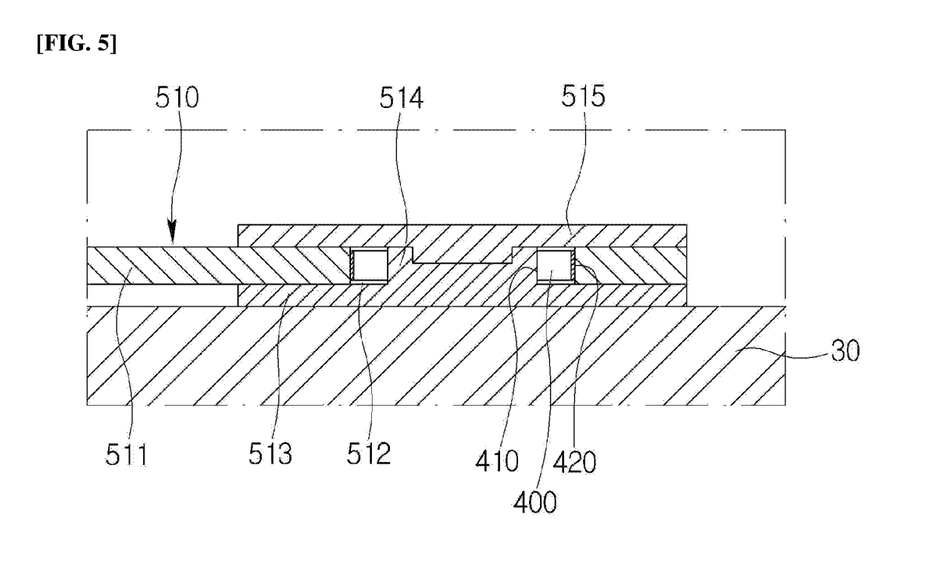
FIG. 5 is a diagram schematically illustrating another embodiment of one side end of the fastening part in the gap adjusting device of the multi-display according to an embodiment of the present disclosure.

FIG. 5 is a diagram schematically illustrating another embodiment of one side end of a fastening part in the gap adjusting device of the multi-display according to an embodiment of the present disclosure.

Referring to FIGS. 1 and 5, a fastening part 510 can include a rotary member 511 having a rotary hole 512 formed at one side end thereof so that the outside contact part 420 of the elastic member 400 is fitted therein and fastened thereto and having the fastening protrusion formed at the other side end thereof, a fixing member 513 adhered and fastened to the second display 30 and having a support protrusion 514 formed so that the inside contact part 410 of the elastic member 400 is fitted therein and fastened thereto, and a cap member 515 fastened to the fixing member 513 in order to prevent the rotary member 511 from being detached from the fixing member 513. Herein, the other side end of the rotary member 511 is prepared to have the same shape as the fastening part 300 described above.

When it is prepared with such a configuration, the fixing member 513 can be attached using an adhesive, etc. without preparing a separate fixing configuration in the second display 30. Then, the elastic member 400 can be supported by the support protrusion 514 formed on the fixing member 513, and prepared so that the fastening protrusion is inserted into and fastened to the uneven part 230 formed on the locking part 200 by preparing so that the rotary member 511 is pulled while rotating.

Figure 6A:
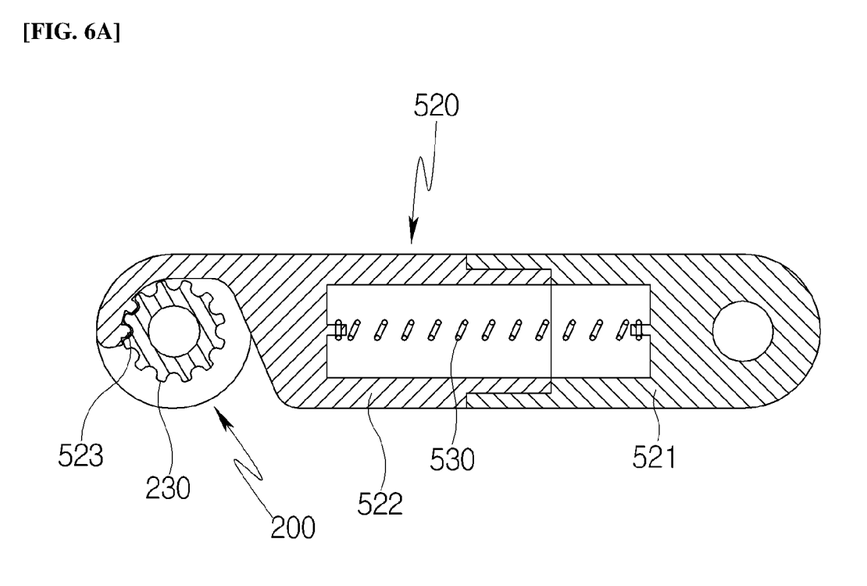
FIGS. 6A and 6B are diagrams schematically illustrating another embodiment of the fastening part in the gap adjusting device of the multi-display according to an embodiment of the present disclosure.
Figure 6B:
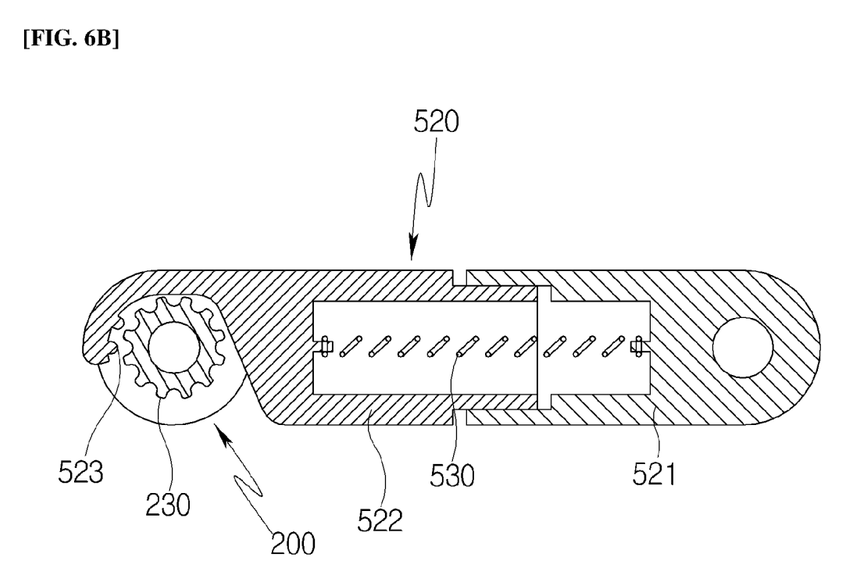

FIGS. 6A and 6B are diagrams schematically illustrating another embodiment of the fastening part in the gap adjusting device of the multi-display according to an embodiment of the present disclosure.

Referring to FIGS. 6A and 6B, a fastening part 520 can include a rotary link 521 rotatably fastened to the second display 30, and a fastening link 522 fastened to the rotary link 521 to be slidably moved and having a fastening protrusion 523 formed at the end portion thereof.

In this case, an elastic member 530 is prepared to have a tension spring shape to be fastened between the rotary link 521 and the fastening link 522.

For example, as in FIG. 6B, when the user pulls the fastening link 522, the fastening link 522 is slidably moved with respect to the rotary link 521, and when the user releases it, the fastening link 522 returns to its original position by the elastic force of the elastic member 530 as in FIG. 6A.

Herein, the rotary link 521 can have the second protrusion prepared in the second display and can be rotatably fastened to the second protrusion, or can be prepared to be rotated in contact with the second display by being prepared with the configuration described with reference to FIG. 5.

When it is prepared with such a configuration, if the user grips and rotates the fastening link 522 and then pulls the fastening link 522, the fastening link 522 slides out while moving on the rotary link 521, and at this time, a compressive elastic force is generated in the elastic member 530.

Then, when the fastening link 522 is rotated in the horizontal direction so that the fastening protrusion 523 is disposed at the front of the uneven part 230 in a state where the fastening link 522 has been pulled and then released, the fastening link 522 returns to its original position while slidably moving by the elastic force of the elastic member 530, and at this time, the fastening protrusion 523 is inserted into and fastened to the uneven part 230. Through this simple structure and method, the adjacent displays can be fastened in the zero gap state.

Figure 7:
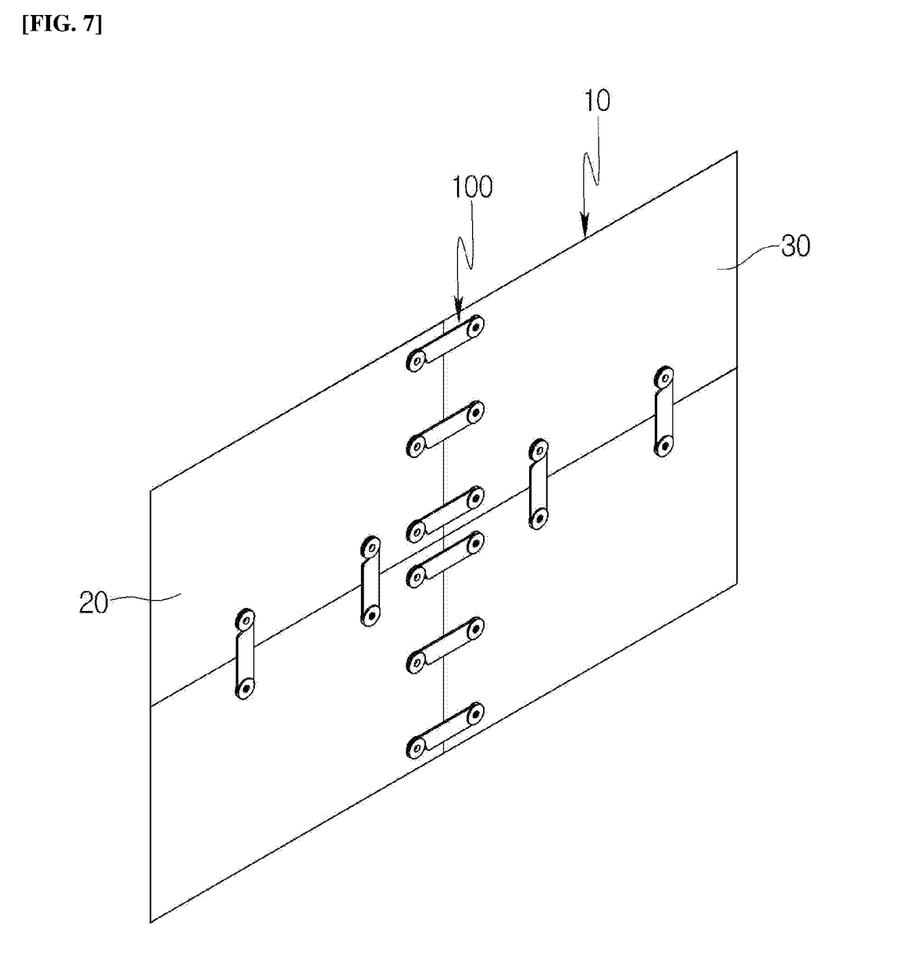
FIG. 7 is a perspective diagram schematically illustrating the multi-display according to an embodiment of the present disclosure.

FIG. 7 is a perspective diagram schematically illustrating the multi-display according to an embodiment of the present disclosure.

A multi-display 10 according to an embodiment of the present disclosure includes the first display 20, the second display 30 disposed adjacent to the first display 20, and the gap adjusting device 100 coupled to each of the first display 20 and the second display 30 and for adjusting a gap between the first display 20 and the second display 30.

Herein, the gap adjusting device 100 includes the locking part 200 provided in the first display 20 and having the uneven part formed thereon, the fastening part 300 having one side end rotatably fastened to the second display 30 and having the fastening protrusion formed at the other side end thereof to be inserted into and fastened to the uneven part of the locking part 200, and the elastic member provided at the fastening part 300 and for applying the elastic force in order to keep a state where the fastening protrusion has been inserted into the uneven part of the locking part.

Since the gap adjusting device 100 has been described above with reference to FIGS. 1 to 4, a detailed description thereof will be omitted.

As illustrated in FIG. 7, the gap adjusting device 100 can be prepared in plural in order to fasten adjacent displays. For example, it can be horizontally installed in plural in the traverse direction of the display, and vertically installed in plural in the longitudinal direction of the display to fasten a plurality of displays with the zero gap.

Of course, although it has been illustrated in FIG. 7 that the four displays are arranged in only two rows and two columns, the present disclosure is not limited thereto, and can be prepared in various forms according to the installation place and if necessary, such as two rows and three columns or three rows and four columns.

According to the gap adjusting device of the multi-display and the multi-display including the same according to one or more embodiments of the present disclosure, it is possible to install the locking part and the fastening part of the gap adjusting device at the displays adjacent to each other, respectively, and fasten the fastening part to the locking part, thereby easily adjusting the gap between the displays. For example, it is possible to achieve the zero gap so that the gap does not occur between the displays, thereby enhancing the display quality of the multi-display.

As described above, although the present disclosure has been described with reference to the limited embodiments and drawings, it should be understood that the present disclosure is not limited thereto and various modifications and deformations can be made by those skilled in the art to which the present disclosure pertains within the technical spirit of the present disclosure and the equivalent scope of the appended claims.

What is claimed is:

1. A gap adjusting device of a multi-display, the gap adjusting device comprising:
    a locking part fastened to a first display, and having an uneven part;
    a fastening part having one side end rotatably fastened to a second display adjacent to the first display, and having a fastening protrusion formed at another side end of the fastening part to be inserted into and fastened to the uneven part of the locking part; and
    an elastic member provided at the fastening part, and configured to apply an elastic force in order to keep a state where the fastening protrusion has been inserted into the uneven part of the locking part,
    wherein when the fastening protrusion is formed in two or more, the fastening protrusions are formed at an interval corresponding to the uneven part of the locking part.

2. The gap adjusting device of the multi-display of claim 1,
    wherein the locking part comprises:
    a flange prepared in a pair to be disposed to face each other, and spaced apart from each other so that the fastening part is inserted;
    a connecting part configured to connect the flange in the pair, and prepared with a diameter smaller than the flange; and
    the uneven part formed along an outer circumferential surface of the connecting part.

3. The gap adjusting device of the multi-display of claim 2, wherein the locking part has any one side of the flange adhered and fastened to the first display, or has a fastening hole, which is formed to be penetrated at a center of the connecting part, inserted into and fastened to a first protrusion prepared in the first display.

4. The gap adjusting device of the multi-display of claim 1, wherein the elastic member is disposed to be bent so that a plate spring having a certain width has a wavy shape along a circumferential direction, and an inside contact part and an outside contact part having diameters differently from each other are disposed along the circumferential direction.

5. The gap adjusting device of the multi-display of claim 4, wherein the fastening part has a through-hole formed at one side end thereof, and has an insertion groove formed at a diameter corresponding to the diameter of the outside contact part of the elastic member along the circumferential direction from the inside surface of the through-hole so that the elastic member is inserted therein and fastened thereto.

6. The gap adjusting device of the multi-display of claim 5, wherein the elastic member has the inside contact part inserted into and fastened to a second protrusion prepared in the second display, and has the outside contact part inserted into and fastened to the insertion groove of the fastening part, and
    wherein the through-hole of the fastening part has a diameter larger than the second protrusion.

7. The gap adjusting device of the multi-display of claim 4, wherein the fastening part comprises:
    a rotary member having a rotary hole formed at one side end thereof so that the outside contact part of the elastic member is fitted therein and fastened thereto, and having the fastening protrusion formed at another side end thereof;
    a fixing member adhered and fastened to the second display, and having a support protrusion formed so that the inside contact part of the elastic member is fitted therein and fastened thereto; and
    a cap member fastened to the fixing member in order to prevent the rotary member from being detached from the fixing member.

8. The gap adjusting device of the multi-display of claim 1, wherein the fastening part comprises:

a rotary link rotatably fastened to the second display; and a fastening link fastened to the rotary link to be slidably moved, and having the fastening protrusion formed at an end portion thereof, and wherein the elastic member is fastened between the rotary link and the fastening link.

9. The gap adjusting device of the multi-display of claim 1, wherein the fastening part has the another side end prepared to have a ring shape, and has the fastening protrusion formed at an end thereof toward the inside of a longitudinal direction.

10. A multi-display, comprising:

a first display;

a second display disposed adjacent to the first display; and a gap adjusting device coupled with the first display and the second display, respectively, and configured to adjust a gap between the first display and the second display, wherein the gap adjusting device comprises:

a locking part provided in the first display, and having an uneven part;

a fastening part having one side end rotatably fastened to the second display, and having a fastening protrusion formed at another side end of the fastening part to be inserted into and fastened to the uneven part of the locking part; and an elastic member provided at the fastening part, and configured to apply an elastic force in order to keep a state where the fastening protrusion has been inserted into the uneven part of the locking part, and when the fastening protrusion is formed in two or more, the fastening protrusions are formed at an interval corresponding to the uneven part of the locking part.

* * * * *